Sept. 8, 1931.   D. E. MACCABEE   1,822,052
REFRIGERATING APPARATUS
Filed March 30, 1928
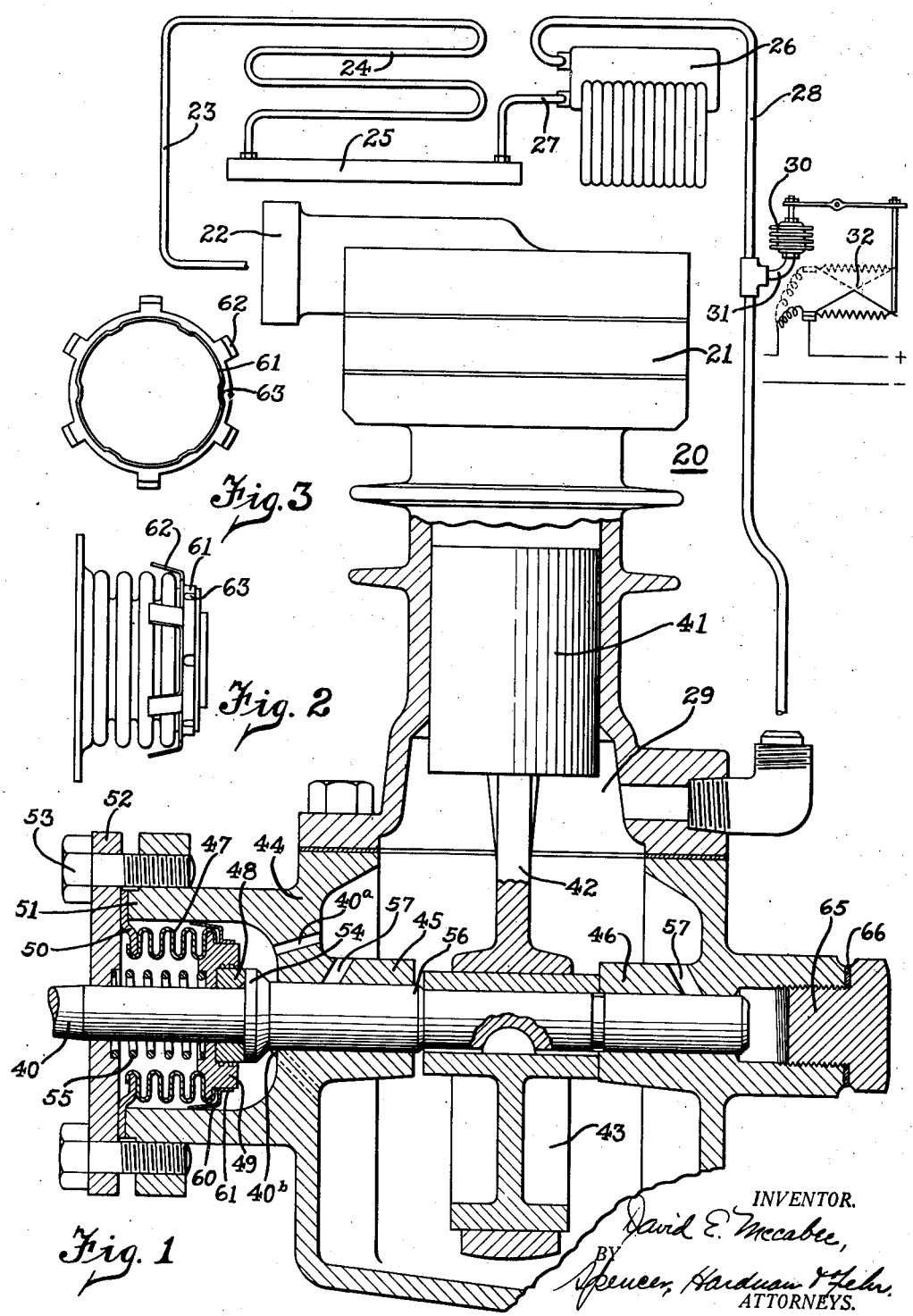

Patented Sept. 8, 1931

1,822,052

UNITED STATES PATENT OFFICE

DAVID E. MACCABEE, OF DAYTON, OHIO, ASSIGNOR TO FRIGIDAIRE CORPORATION, OF DAYTON, OHIO, A CORPORATION OF DELAWARE

REFRIGERATING APPARATUS

Application filed March 30, 1928. Serial No. 266,056.

This invention relates to refrigerating apparatus and more particularly to a hermetic seal for a shaft passing through said apparatus.

An object of this invention is to provide a seal for a shaft passing through a wall of a refrigerating apparatus which seal is of the resilient self-sealing type and which is provided with means for preventing audible vibrations in said seal.

Another object of this invention is to provide means for checking audible vibrations in a shaft seal of a refrigerating apparatus of the household type.

Another object is to provide means for checking audible vibrations in a shaft seal located in a zone of vibration of said seal.

Another object of this invention is to provide damping means for a seal having audible vibrations, which may be applied at an antinode of said vibrations.

Further objects and advantages of the present invention will be apparent from the following description, reference being had to the accompanying drawing, wherein a preferred form of the present invention is clearly shown.

In the drawings:

Fig. 1 is a view partly in section, partly in elevation and partly diagrammatic of a refrigerating apparatus embodying the features of my invention;

Fig. 2 is an elevation of a portion of the seal embodying features of my invention; and Fig. 3 is an end elevation of a vibration damping member embodying features of my invention.

A refrigerating apparatus, which may be of the type generally known as a household refrigerating apparatus, is generally designated as 20. This type of apparatus is generally installed in places where there is no skilled attendant. Apparatus of this type must be automatic in its operation, and any parts which need practically constant adjustment must be of an automatically adjusted type. This type of apparatus necessarily must operate without any constant care from a skilled attendant. Apparatus of this type may comprise a compressor 21 discharging through an outlet 22 into a pipe 23 which delivers the compressed refrigerant to a condenser 24. A receiver 25 receives the liquefied refrigerant from the condenser 24 and delivers the same to an evaporator 26. This evaporator may have a float controlled valve, not shown, controlling the entrance of liquid refrigerant from the pipe 27. Evaporated refrigerant leaves the evaporator 26 through a pipe 28 which returns the refrigerant to the compressor 21, preferably in the crankcase 29. A means for automatically controlling the operation of the compressor is provided. In this particular embodiment, an expansible bellows 30 is connected by the pipe 31 with the pipe 28. The expansible bellows 30 operates the snap switch 32 which controls the starting and stopping of an electric motor, not shown, which drives the compressor 21.

The compressor 21 is drivingly connected through the shaft 40 with the motor hereinbefore described preferably by a large wheel at the end of shaft 40 driven by a belt connected to a pulley on the motor. The shaft 40 reciprocates a piston 41, preferably through a pitman 42 surrounding an eccentric 43 keyed to the shaft 40. The shaft 40 must pass through a wall of the refrigerating apparatus, which wall is generally designated as 44. The shaft 40 may be supported in bearings 45 and 46.

A seal is provided between the shaft and the wall 44. In this particular embodiment a flexible wall 47 is interposed between the shaft 40 and the refrigerating apparatus wall 44, which wall may be of a type permitting some relative axial movement between its connections. A frictional hermetic sliding connection is provided for the wall 47. Preferably, this sliding connection is provided between the wall 47 and the shaft 40. This sliding connection may include a ring 48 of relatively self-lubricating material of the type disclosed in the patent to Williams et al. 1,642,347. The ring 48 may be hermetically connected with the wall 47 by any suitable means. For instance, a bronze ring 49 may be connected with the wall 47 by brazing or soldering or any other suitable means and the rings 48 and 49 may be joined by any suitable means such as a litharge cement joint. The other edge of the wall 47 may have a hermetic joint with the wall 44 of the refrigerating apparatus. In this particular embodiment the edge of the wall 47 may be hermetically connected with a gasket-like ring 50 interposed between the shoulder 51 of the wall 44 and an end plate 52. The shoulder 51 and the end plate 52 may be clamped together by any suitable means such as bolts 53. The flexible wall 47 may, when relatively great axial flexibility is desired, be of the bellows or corrugated metal type.

In order to provide lubrication, lubricant passages 40a and 40b may connect the crankcase 29 with the space surrounding the seal.

The ring 48 is kept in frictional contact with the shoulder 54 of the shaft 40 to provide a sliding hermetic connection between the wall 47 and the shaft. The shoulder 54 may be integral with, or may be hermetically connected to, the shaft 40. In order to maintain the frictional contact, a spring 55 may be interposed between the end plate 52 and the ring 49. The shaft 40 may be prevented from moving axially to the right by providing a shoulder 56 which abuts against the sleeve of eccentric 43 which in turn abuts against the bearing 46. As shown, lubricating passages 57 may be provided in the bearings 45 and 46.

The hermetic frictional sliding engagement of the seal, which in this particular embodiment occurs between the ring 48 and the shoulder 54, tends to set up audible vibrations in the seal. These vibrations may be of a tortional character or they may be due to a slight movement of the ring 48 away from the shoulder 54. Whatever the cause of these vibrations is, the vibrations are of a very disagreeable nature in a refrigerating apparatus of this type. Means for damping these vibrations into the unaudible range may be provided. In this particular embodiment, a solid material damping member 60 may be connected to the ring 49. The other edge of the damping member 60 may be in contact with a surface which does not have audible vibrations. As an example, the member 60 may be a spider-like member having a cylindrical portion 61 adapted to fit around the ring 49 and may be provided with resilient legs 62 which abut against the cylindrical shoulder 51 of the wall 44. The cylindrical portion 61 may be provided with indentations 63 having a tight contact with the ring 49; but it is obvious that the cylindrical portion may be permanently secured to the ring such as by brazing or soldering.

The damping member as herein contemplated is a solid material damping member. By the word "solid" I mean a member which is of a non-plastic nature and therefore need not be hermetically arrested in its place. It may be yielding and porous in its nature, however. The member preferably is applied at a portion of the seal where the audible vibrations tend to be most violent. In this particular embodiment the end of the seal which is connected to the wall 44 probably never has any extensive vibrations. The end which is in contact with the shaft 40, however, probably has the most violent vibrations. It is thus seen that a seal of this character is liable to have a point where audible vibrations are violent and preferably the damping member is applied at or adjacent such a point. That is, the damping member may be adjacent an antinode of the vibrations.

The end of the shaft 40 which is adjacent the bearing 46 may be hermetically sealed by a threaded nut 65 which has a shoulder abutting against the gasket 66. This seal is of the nonfrictional type so that this seal does not tend to set up audible vibrations. The crankcase 28 contains refrigerant under varying pressures. For instance should the system, which is of the household refrigeration type, be disconnected from the source of electricity for a long period of time such as during transportation or during the absence of occupants of the house, the pressure in the system may become relatively great. Again, at times during the operation of the system, the refrigerant in the casing 28 may be at subatmospheric pressure. Thus it is seen that the pressures within the crankcase 28 may vary greatly. This variation may occur with the use of refrigerant generally used in refrigerating apparatus of the household type.

This type of seal is self-adjusting by its resiliency, but because of the damping means, squeaks are not set up therein.

While the form of embodiment of the invention as herein disclosed, constitutes a preferred form, it is to be understood that other forms might be adopted, all coming within the scope of the claims which follow.

What is claimed is as follows:

1. A seal for a compressor having an apertured wall, a shaft passing through said aperture, a seal between said wall and said shaft comprising a corrugated metallic cylindrical wall surrounding said shaft and having hermetic connections with said wall and with said shaft, one of said connections being a hermetic frictionally sliding connection tending to set up audible vibrations in said seal, and a solid damping member comprising a flexible metallic spider in contact with said seal adjacent said sliding connection and with said compressor wall whereby said contacts tend to prevent said audible vibrations.

2. In a refrigerating apparatus, a shaft passing through a wall of said apparatus, a seal comprising a flexible wall having hermetic connections with said wall and shaft, with a sliding connection in said seal, and a solid damping member comprising a flexible metallic spider in contact with said seal and said apparatus wall for preventing audible vibrations in said seal.

3. A seal for a compressor having an apertured wall, a shaft passing through said aperture, a seal between said shaft and said wall comprising a flexible member hermetically connected to said shaft and wall, there being a frictional hermetic contact in said seal tending to set up audible vibrations in said seal and an annular member having an angularly disposed portion composed of stiff flexible material contacting with said wall and said seal to dampen vibrations.

In testimony whereof I hereto affix my signature.

DAVID E. MACCABEE.